United States Patent
Tang et al.

(10) Patent No.: US 8,682,364 B2
(45) Date of Patent: Mar. 25, 2014

(54) VEHICLE TELEMATICS COMMUNICATION USING TEXT ENCODING OF BINARY DATA

(75) Inventors: Jin Tang, Madison Heights, MI (US); Ki Hak Yi, Windsor (CA); Sethu K. Madhavan, Erie, PA (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 13/287,520

(22) Filed: Nov. 2, 2011
(Under 37 CFR 1.47)

(65) Prior Publication Data
US 2013/0109416 A1    May 2, 2013

(51) Int. Cl.
*H04W 4/00* (2009.01)

(52) U.S. Cl.
USPC ........ 455/466; 455/414.1; 455/418; 455/419; 455/420; 455/424; 455/425; 370/310.2; 370/312; 341/50; 341/51; 341/55; 341/95

(58) Field of Classification Search
USPC .............. 455/414.1, 418–420, 423–425, 466; 370/310.2, 312; 341/50, 51, 55, 95
See application file for complete search history.

(56) References Cited

U.S. PATENT DOCUMENTS

| | | | |
|---|---|---|---|
| 6,842,762 B2* | 1/2005 | Raithel et al. | 701/29.4 |
| 7,450,030 B2* | 11/2008 | Ringel et al. | 340/999 |
| 7,557,738 B2* | 7/2009 | Hunt | 341/55 |
| 2006/0240850 A1* | 10/2006 | Kaplan | 455/466 |
| 2007/0111795 A1* | 5/2007 | Choi et al. | 463/42 |

* cited by examiner

*Primary Examiner* — Steve D Agosta
(74) *Attorney, Agent, or Firm* — Anthony Luke Simon; Reising Ethington P.C.

(57) ABSTRACT

A system and method for sending binary data via a short message service (SMS) over a wireless communication system. The method provides the capability to send and receive binary data to a vehicle telematics unit using a text SMS message. The binary data is converted to encoded text according to an encoding scheme supported by a wireless communication system. Then, the encoded text is sent as an SMS message over the wireless communication system. Once, the SMS message containing the encoded text is received at its destination, it is converted back to binary data.

16 Claims, 3 Drawing Sheets

VEHICLE TELEMATICS COMMUNICATION USING TEXT ENCODING OF BINARY DATA

TECHNICAL FIELD

The present invention relates generally to vehicle telematics communication, and more particularly, to sending binary data to and from vehicles.

BACKGROUND OF THE INVENTION

Short message service (SMS) provides the capability to send and receive communication messages between phones, computers, web or mobile communication systems. The communication message may contain text or binary data which makes an SMS message a so-called text SMS or binary SMS. A binary message may have 140 bytes of data. Although a text SMS may be widely used and supported by wireless networks, a binary SMS may not be as widely supported by wireless networks due to security reasons of an operator of a wireless network, for example. However, in some instances, there may be a need to send binary SMS between machines (M2M), mobile communication systems, and others for testing, research and development, and/or other purposes.

SUMMARY OF THE INVENTION

According to one embodiment of the invention, there is provided a method of sending binary data via a short message service (SMS) over a wireless communication system, comprising the steps of: (a) converting the binary data to encoded text according to an encoding scheme used by the wireless communication system to send SMS messages; (b) sending the encoded text as an SMS message over the wireless communication system; (c) receiving the SMS message containing the encoded text; and (d) converting the encoded text back to the binary data.

According to another embodiment of the invention, there is provided a method of sending binary data via a short message service (SMS) over a wireless communication system, comprising the steps of: (a) obtaining binary data for transmission via a short message service (SMS) of a wireless communication system; (b) grouping every 6 successive bits of the binary data; (c) identifying for each group of 6 successive bits an associated text character that can be sent via SMS over the wireless communication system; (d) creating an SMS message from the identified text characters; and (e) sending the SMS message over the wireless communication system.

In accordance with yet another embodiment of the invention, there is provided a communication unit for a vehicle for sending binary data via a short message service (SMS) over a wireless communication system, wherein the communication unit includes a processor and computer readable memory that contains instructions that are executed by the processor to carry out the following steps: (a) converting the binary data to encoded text according to an encoding scheme used by the wireless communication system to send SMS messages; (b) sending the encoded text as an SMS message over the wireless communication system; (c) receiving the SMS message containing the encoded text; and (d) converting the encoded text back to the binary data.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

The system and methods described below send binary data via a short message service (SMS) over a wireless communication system. This involves converting the binary data to encoded text according to an encoding scheme. Later, the encoded text is packaged to an appropriate format such as a short message and sent to its destination. The packaging of the communication message can involve including an identifier identifying the message as being a converted binary data as described herein.

Communications System—

Figure 1:
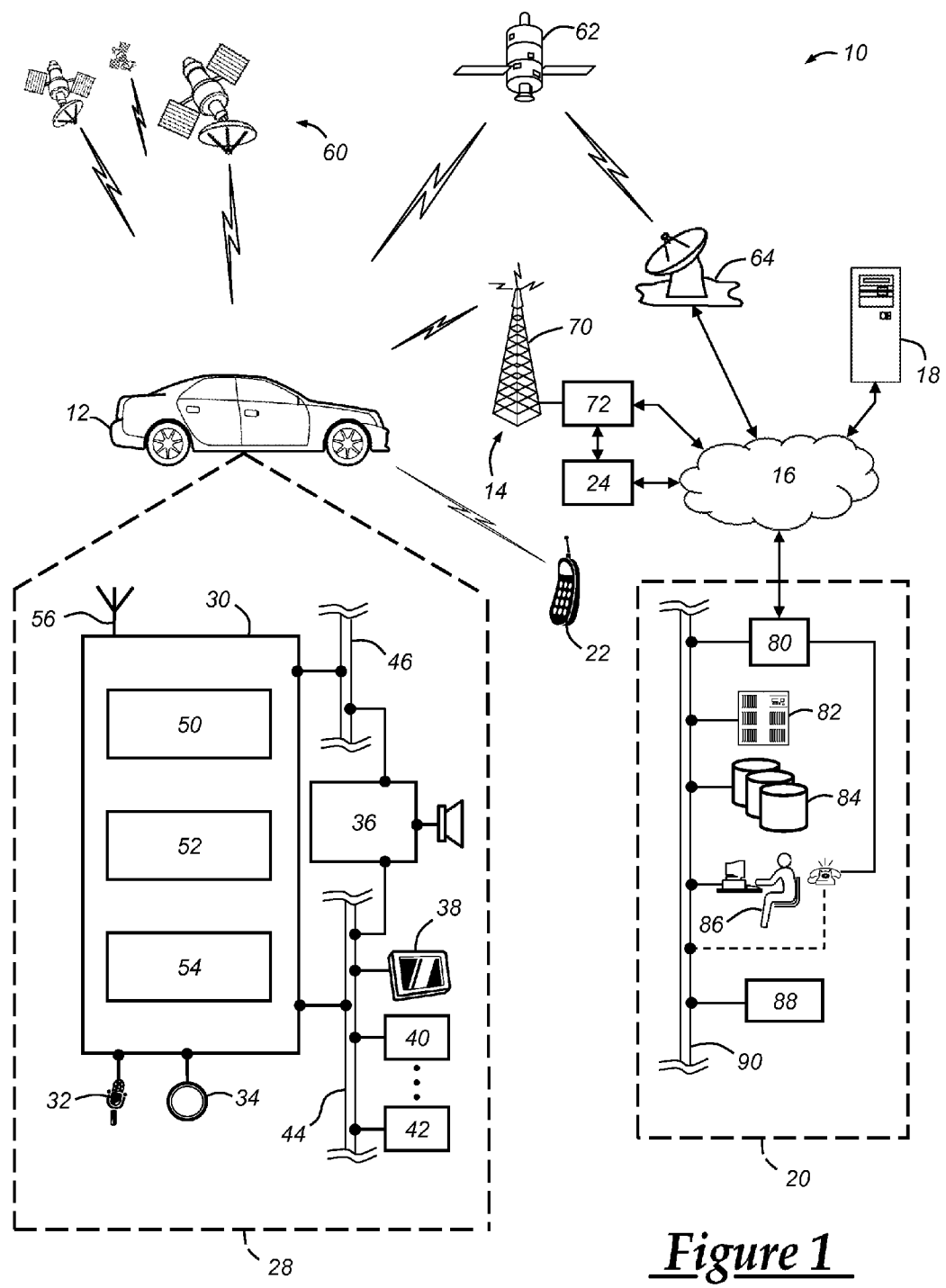
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to a standard such as CDMA, GSM, and/or LTE and thus includes a cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, EDGE, and LTE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering.

Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000), GSM/GPRS, or LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Apart from computer 18, other types of remotely located processing devices can be used. For example, a mobile device 22 can be used and can be one of a number of such communication devices used by subscribers. Each mobile device 22 is a processing device that can be used for one or more purposes, such as voice communication, text messaging, email, web browsing, gaming, camera, video recording, sending and receiving photos and videos, audio player (e.g., MP3), radio, GPS navigation, personal organizer, to name but a few. In the illustrated embodiment, mobile device 22 is a mobile phone also known as a cell or cellular phone that connects to a cellular network such as system 14. In another embodiment, mobile device 22 can be a personal digital assistant (PDA) that may or may not provide telephony services. Mobile device 22 can employ one of a variety of wireless technology including Bluetooth (e.g. hands-free headset, games, watches, sports sensors, medical devices, etc.), etc. Various other types of suitable processing devices will be apparent to those skilled in the art.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Short message service center (SMSC) 24 is preferably in communication with wireless carrier system 14 and/or land network 16 and is involved in the communication of SMS messages. SMSC 24 can operate according to a store-and-forward principal; that is, when a first user sends an SMS message that is intended for a second user, the SMS message gets stored at the SMSC until the second user is available to receive it. In other embodiments, the SMSC employs a store-and-forget approach where it only attempts to pass the SMS message along one time. These types of approaches enable users to send and receive SMS messages at any time, even if they are currently on a voice call. It should of course be appreciated that the exemplary representation of SMSC 24 is but one example of a suitable arrangement, as the SMSC could instead be provided according to some other configuration known in the art. For instance, SMSC 24 could be integrated within wireless carrier system 14 and/or land network 16, instead of being schematically shown as a separate stand-alone component. Also, it is to be understood that multiple SMSCs may be utilized.

Method—

Figure 2:
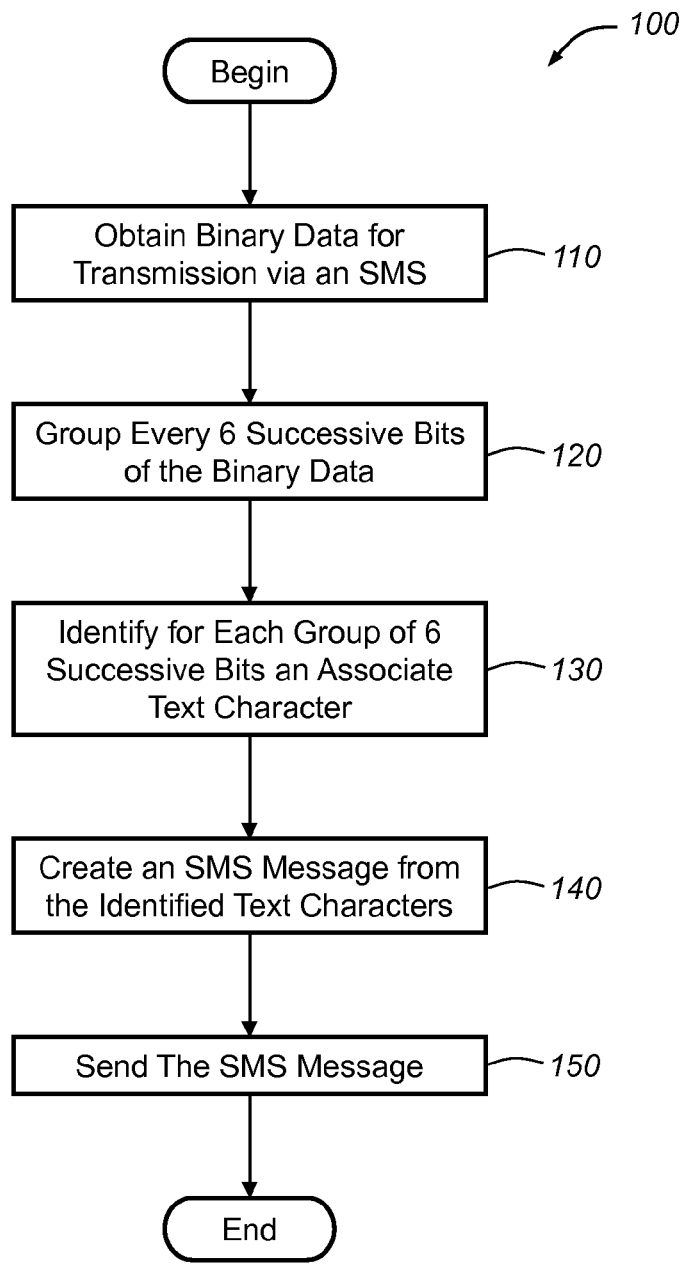
FIG. 2 is a flowchart depicting one embodiment of a method of sending binary data via a short message service (SMS) over a wireless communication system such as the one described in FIG. 1.

Turning now to FIG. 2, there is shown a method 100 for sending binary data via a short message service (SMS) over a wireless communication system. This method starts at step 110 and begins by obtaining binary data for transmission via a short message service (SMS) of a wireless communication system. In one embodiment, call center 20 may need to send binary data to vehicle 12. In another embodiment, binary data is sent between the vehicle 12 and mobile device 22. In another embodiment, the binary data may be sent between the telematics units of two vehicles. And in yet another embodiment, the binary data may be sent between two mobile devices, whether they are located in vehicles are otherwise. When used between the call center 20 and vehicle 12, the binary data may be related to a telematics service requested by an occupant of vehicle 12, a vehicle repair or maintenance service including requesting one or more components of vehicle 12 mechanical or electronic status, upgrading one or more vehicle components, vehicle 12 testing, calibrating and/or any other manufacture-related data. Or vehicle 12 may send binary data to call center 20. In this case the binary data may include a request for a telematics service by an occupant of vehicle 12, a response about an inquiry from call center 20, or any other type of binary data. The binary data can be represented as hexadecimal numbers of a WAP Binary XML (WBXML) or any other suitable technique. Other examples of binary data that can be obtained include WAP push messages, logos, ringtones, pictures, themes, or software on other computer-readable instructions.

Next, at step 120, method 100 groups every 6 successive bit of the binary data. This is only one embodiment as others are also possible. For example, in another embodiment, every 6 successive even bits are grouped. In another embodiment, every 6 successive odd bits are grouped. Furthermore, the numbers of bits grouped can be more or less than 6 bits. Skilled artisans will recognize other embodiments to group the binary data. Optionally, the method can first determine if binary SMS is supported by the network (i.e., the particular wireless carrier being used) and if so, send the binary data as is, but if not, then proceed to convert it using steps 120-140.

In step 130, method 100 identifies for each group of 6 successive bits an associated text character. In one embodiment, telematics unit 30 performs this step if, for example, the binary data is to be sent from vehicle 12 to call center 20. In another embodiment, call center 20 performs this step if, for example, the binary data is to be sent from call center 20 to vehicle 12. Skilled artisans should appreciate that the maximum value of 6 successive binary bits is 63 decimal (e.g., 111111 binary is 63 decimal); therefore, there are 64 numbers from 0 to 111111 binary. Hence, in a preferred embodiment, method 100 maps each group of 6 successive bits to one of a plurality of encoded text characters and it provides each group of 6 successive bits with a binary value of its corresponding mapped encoded text character. For instance, binary value 0 can be mapped to the letter "a" whose binary value is 97 decimal. Binary value 1 can be mapped to the letter "b" whose binary value is 98 decimal. This procedure continues until all 64 binary values are mapped. The encoded text characters may be selected from a group of encoded text characters that comprises the characters "a" through "z", "A" through "Z", "0" through "9", and one or more non-alphanumeric symbols. Furthermore, the non-alphanumeric symbols may be selected from a group that includes, for example, "!", "?", ",", "@", and/or any other symbol which it is supported by communication system 10. In one embodiment, the binary value of the encoded text characters including the non-alphanumeric characters does not exceed 127 decimal (i.e., 1111111 binary). Therefore, in this embodiment, the maximum number of bits used by method 100 for to map each 6 successive binary bits to a text character is 7 bits. Of course other embodiments are also possible such as using an 8 bit encoding scheme. Skilled artisans should appreciate that the encoded text characters are not limited to only one standard such an ASCII standard, they could be also encoded according to other standards including Unicode (e.g., UTF-8, UTF-16, etc.), GSM 03.38, etc. In addition, the sender and receiver of the binary data may store one or more decoding maps for the text characters into their corresponding binary groups of 6 successive bit data. In one embodiment, vehicle 12 stores one or more decoding maps at memory 54. In another embodiment, call center 20 stores one or more decoding maps at databases 84.

Figure 3:
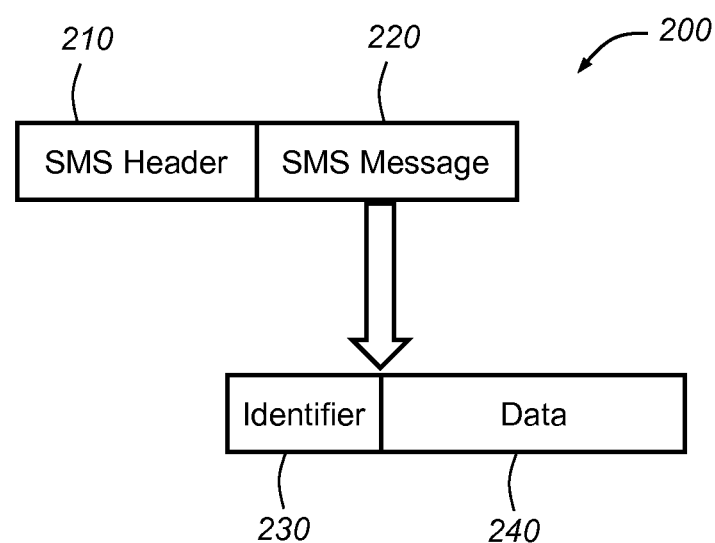
FIG. 3 is a block diagram depicting one embodiment of an SMS message that may be sent by the method of FIG. 2.

Next, at step 140, method 100 creates an SMS message from the identified text characters. In one embodiment, call center 20 concatenates the encoded text characters of the binary data in the same order as they were encoded. Furthermore, the SMS message may contain an identifier that precedes the concatenated encoded text characters. In one embodiment, the identifier is one byte whose value is 1 when the data is a converted binary data and 0 when the data is not a converted binary data. Other embodiments are also possible, for example, the identifier can be only one bit whose value is either 0 or 1. In another embodiment, information identifying the sender (e.g., the sender's MIN or MDN) is used to identify the encoding. Thus, for example, when the vehicle determines that a received SMS was sent from the call center, it can be configured to know that the message was encoded and proceed to convert the text characters back into the binary data. In such a case the encoding "identifier" is either vehicle 12 or call center 20 corresponding phone number. FIG. 3 shows an example SMS message 200. SMS header 210 contains, as skilled artisans will recognize, service center address, destination address, protocol identifier, time stamp, user data length, etc. Meanwhile, SMS message 220 may contain an identifier 230 identifying the data 240 as being a converted binary data as described herein.

At step 150, method 100 sends the SMS message to its destination. In one embodiment vehicle 12 sends SMS message 200 via its telematics unit 30 to call center 20 over wireless communication system 10. In another embodiment, call center 20 sends an SMS message 200 to vehicle 12 over wireless communication system 10. Any known technology can be used to deliver the SMS message to its intended recipient including general packet radio service (GPRS), enhanced GPRS (EGPRS or EDGE), circuit switched data (CSD), high speed circuit switched data (HSCSD), or others over a wireless network including code division multiple access (CDMA), wideband CDMA (W-CDMA), time division multiple access (TDMA), global system for mobile communications (GSM), 3GPP long term evolution (LTE), etc.

Additionally, method 100 can include receiving the SMS message containing the encoded text at its destination and converting the encoded text back to its original binary data form. In one embodiment, call center 20 receives the SMS message and later recognizes via identifier 230 or the sender's phone number, or otherwise that the SMS message 200 contains encoded text that it is actually a converted binary data. Then, call center 20 converts the encoded text back to binary data using an encoding map that it is stored in database 84. Finally, the binary data is concatenated together in the same order that it is converted to obtain the entire binary data in its original form.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of sending binary data via a short message service (SMS) over a wireless communication system, comprising the steps of:
(a) converting the binary data to encoded text according to an encoding scheme used by the wireless communication system to send SMS messages;
(b) sending the encoded text as an SMS message over the wireless communication system;
(c) receiving the SMS message containing the encoded text; and
(d) converting the encoded text back to the binary data;
wherein step (a) further comprises the steps of separating the binary data into groups of 6 bits and mapping each group of 6 bits to one of a plurality of encoded text characters; and
wherein the encoded text characters are selected from a group of encoded text characters that comprises the characters "a" through "z", "A" through "Z", "0" through "9", and one or more non-alphanumeric symbols; and
wherein step (b) further comprises sending the SMS message from either a vehicle or a call center, step (c) further comprises receiving the SMS message at the other of the call center or vehicle, and step (d) further comprises recognizing that the sender of the SMS message is either the vehicle or call center by identifying a unique identifier associated with the sender.

2. The method of claim 1, wherein the wireless network used by the wireless communication system is a CDMA, GSM, or LTE wireless network.

3. The method of claim 1, wherein the encoded text are characters that are encoded according to a standard such as ASCII, Unicode (e.g., UTF-8. UTF-16, etc.), GSM 03.38 or others.

4. The method of claim 1, wherein step (a) further comprises the step of adding an identifier to the encoded text identifying it as being a converted binary data and step (d) further comprises the step of converting the encoded text back to the binary data in response to receiving the identifier.

5. The method of claim 1, wherein the groups of 6 bits are each groups of 6 successive bits of the binary data, and wherein step (a) further comprises providing each group of 6 successive bits with a binary value of its corresponding mapped encoded text character.

6. The method of claim 1, wherein steps (a)-(b) are performed by a vehicle telematics unit.

7. The method of claim 1, wherein the unique identifier of the vehicle or call center comprises their corresponding phone number.

8. A method of sending binary data via a short message service (SMS) over a wireless communication system, comprising the steps of:
(a) obtaining binary data for transmission via a short message service (SMS) of a wireless communication system;
(b) grouping every 6 successive bits of the binary data;
(c) identifying for each group of 6 successive bits an associated text character that can be sent via SMS over the wireless communication system;
(d) creating an SMS message from the identified text characters; and
(e) sending the SMS message over the wireless communication system;
wherein step (c) further comprises providing each group of 6 successive bits with a binary value of its corresponding mapped encoded text character; and
wherein the encoded text characters are selected from a group of encoded text characters, that comprises the characters "a" through "z", "A" through "Z", "0" through "9", and one or more non-alphanumeric symbols; and
wherein step (e) further comprises sending the SMS message from either a vehicle or a call center, receiving the SMS message at the other of the call center or vehicle, and recognizing that the sender of the SMS message is either the vehicle or call center by identifying a unique identifier associated with the sender.

9. The method of claim 8, wherein step (a) is preceded by an additional step determining that the communication is sent or received from/to vehicle to/from a call center.

10. The method of claim 9, wherein the call center is a vehicle manufacturer related call center.

11. The method of claim 8, wherein the encoded text are characters that are encoded according to a standard such as ASCII, Unicode (e.g., UTF-8. UTF-16, etc.), GSM 03.38 or others.

12. The method of claim 8, wherein step (d) further comprises the step of adding an identifier in the SMS message identifying it as being a converted binary data.

13. The method of claim 8, wherein steps (a) through (e) or part of them are performed by a vehicle telematics unit.

14. The method of claim 8, wherein step (d) further comprises creating the SMS message by concatenating the identified text characters together.

15. A communication unit for a vehicle for sending binary data via a short message service (SMS) over a wireless communication system, wherein the communication unit includes a processor and computer readable memory that contains instructions that are executed by the processor to carry out the following steps:

(a) converting the binary data to encoded text according to an encoding scheme used by the wireless communication system to send SMS messages;

(b) sending the encoded text as an SMS message over the wireless communication system;

(c) receiving the SMS message containing the encoded text; and (d) converting the encoded text back to the binary data;

wherein step (a) further comprises the steps of separating the binary data into groups of 6 bits and mapping each group of 6 bits to one of a plurality of encoded text characters; and wherein the encoded text characters are selected from a group of encoded text characters, that comprises the characters "a" through "z", "A" through "Z", "0" through "9", and one or more non-alphanumeric symbols; and wherein step (b) further comprises sending the SMS message from either a vehicle or a call center, step (c) further comprises receiving the SMS message at the other of the call center or vehicle, and step (d) further comprises recognizing that the sender of the SMS message is either the vehicle or call center by identifying a unique identifier associated with the sender.

16. A communication unit as defined in claim 15, wherein the communication unit is a vehicle telematics unit.

\* \* \* \* \*